T. B. TEEL.
COMPENSATING PISTON PIN.
APPLICATION FILED MAR. 18, 1920.
1,365,867. Patented Jan. 18, 1921.
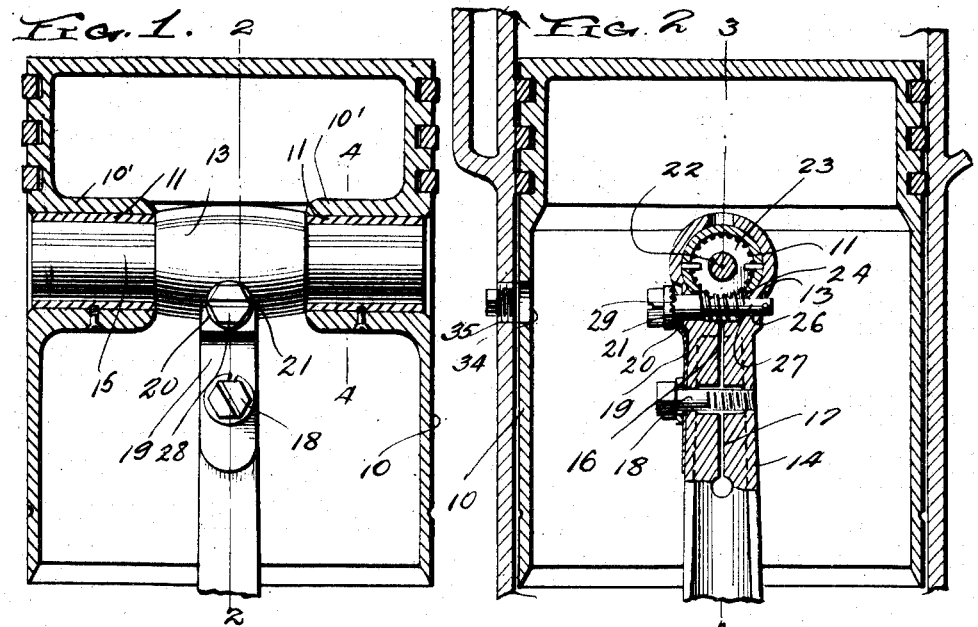
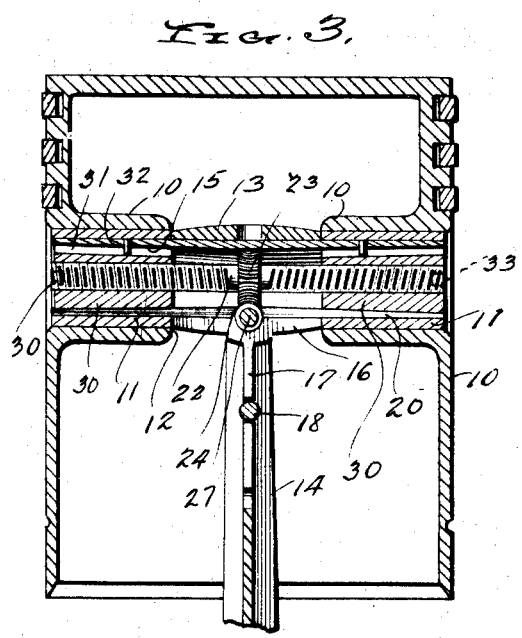
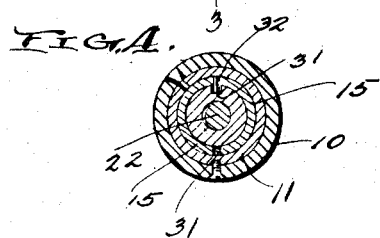
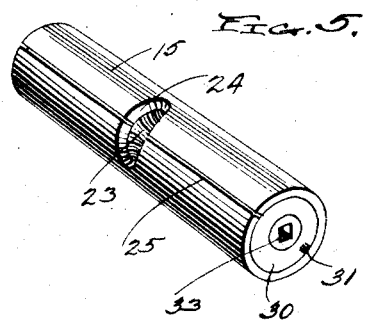
Inventor
Thomas B. Teel

UNITED STATES PATENT OFFICE.

THOMAS B. TEEL, OF HURON, SOUTH DAKOTA, ASSIGNOR OF ONE-HALF TO MAX ROYHL, OF HURON, SOUTH DAKOTA.

COMPENSATING PISTON-PIN.

1,365,867. Specification of Letters Patent. Patented Jan. 18, 1921.

Application filed March 18, 1920. Serial No. 367,013.

*To all whom it may concern:*

Be it known that I, THOMAS B. TEEL, a citizen of the United States, residing at Huron, in the county of Beadle, State of South Dakota, have invented certain new and useful Improvements in Compensating Piston-Pins; and I do hereby declare the following to be a full, clear, and exact description of the invention, such as will enable others skilled in the art to which it appertains to make and use the same.

This invention relates to new and useful improvements in engine or like pistons, and particularly to the pins which connect the piston rods to the pistons.

One object of the present invention is to produce a novel and improved device of this character wherein provision is made for the adjustment of the piston, to compensate for the wear thereof, and the wear of the bushing in which it rotates.

Another object is to provide a novel and improved device of this character which can be easily and quickly manipulated without removing the piston from the cylinder.

Another object is to provide a novel and improved adjusting means for the wrist pin of a piston which includes means for locking the same against accidental displacement.

Other objects and advantages will be apparent from the following description when taken in connection with the accompanying drawing.

In the drawing:

Figure 1 is a vertical longitudinal sectional view through a piston showing the wrist pin and piston rod in elevation.

Fig. 2 is a vertical longitudinal sectional view taken centrally through the piston, a portion of the cylinder and the piston rod and wrist pin, on the line 2—2 of Fig. 1.

Fig. 3 is a vertical transverse sectional view taken centrally through the wrist pin and piston, on the line 3—3 of Fig. 2.

Fig. 4 is a vertical sectional view through one end of the wrist pin and the tapered plug therein, on the line 4—4 of Fig. 1, showing the pin carried by the bushing which engages in the groove of the plug to prevent rotation thereof.

Fig. 5 is a perspective view of the piston pin removed from the piston and without the operating screw for the threaded stem of the tapered plugs.

Referring particularly to the accompanying drawing, 10 represents a piston having the wrist pin bearings 10' in which are disposed the bushing sleeves 11, a space or opening 12 being arranged between the bearings for the reception and play of the tubular head 13 of the piston rod 14. Disposed longitudinally through the bushings 11 is the wrist pin 15, which also is disposed through the tubular head 13 of the piston rod 14. The head 13 is split longitudinally at its point of juncture with the piston rod, as shown at 16, while the adjacent portion of the piston rod is longitudinally split, at 17, in continuation of the split of the head. Disposed through the piston rod, and threaded into the same, at one side of the split, is a clamping screw 18 for drawing the head into firm frictional embracing engagement with the wrist pin. Held by the screw 18, is one end of a leaf spring 19, the outer or free end of which is disposed adjacent the tubular head 13, and is formed with a forked portion 20. One leg of the fork is bent outwardly to form a pawl 21, to which reference will be made later herein.

Disposed within the wrist pin, which pin is hollow, as shown, is a stem 22 having a worm wheel 23 secured to its intermediate portion. The periphery of the worm wheel 23 rotates in an elongated slot 24 formed in the outer face of the wrist pin. The wrist pin is split longitudinally, as shown at 25, said split extending transversely through the center of the slot 24. Formed transversely through the piston rod, at the point of juncture with the head 13, is an opening 26 through which is disposed a worm shaft 27 which meshes with the worm wheel 23. The worm shaft 27 is formed with a head 28 in which is formed a slot for the reception of a screw driver, and by which means the shaft is adapted to be turned to rotate the stem 22. The inner face of the head 28 is formed with a series of teeth 29 with which the pawl leg 21 of the leaf spring 19 engages to prevent retrograde rotation of the worm shaft.

The portions of the stem 22, at opposite sides of the worm wheel 23 are formed with right and left threads, respectively, and engaged on each of said portions is a tapered plug 30 which enters the corresponding end of the wrist pin to cause expansion thereof, whereby the wrist pin will be made to fit more snugly within the bushing 11. In the outer face of each plug there is formed a longitudinal groove 31 in which engages a pin 32 carried by the wrist pin, and which extends inwardly therefrom. This pin holds the plug against rotation within the wrist pin, but permits longitudinal movement thereof within the wrist pin. In the outer end of each plug there is formed a central angular recess 33 for the reception of the angular end of a suitable tool for turning the plug, when the piston has been completely removed from the cylinder. This is used when the device is applied to engines already in use, in which case the screw 27 is omitted. When, however, the device is built in new engines, the piston not being removed from the cylinder, the screw driver is passed through openings 34 and 35 formed in the cylinder wall and in the skirt of the piston, respectively, and engaged with the slot of the head of the worm shaft 22. A plug 36 is provided for the opening 34 of the cylinder wall to prevent outward splashing of oil from the crank case. It will be noted that the opening 34 of the piston wall is necessarily formed at a point below the lower end of the water jacket of the cylinder.

By reason of the inward taper of each of the plugs, and the fact that the wrist pin is split throughout its length, when the worm wheel 23 is rotated, the threaded portions of the stem 22 will cause the plugs to be moved inwardly or outwardly of the wrist pin, with the result that the wrist pin is expanded or contracted to permit the same to fit properly within the bushing, and thus take up the wear and prevent the knocking thereof.

What is claimed is:

1. A piston wrist pin including an expandible body, a turnbuckle in the body and having a pinion thereon, expanding members carried by the turnbuckle, and a pinion for rotating the turnbuckle.

2. The combination with a cylinder and piston having openings adapted for registry at times, of a piston wrist pin including a longitudinally split hollow body, an oppositely threaded stem in the body, a worm wheel on the stem, a piston rod embracing the pin, and a worm shaft carried by the piston rod and engaging with the worm wheel, access to said worm shaft being had through said piston and cylinder openings.

3. A piston wrist pin including a split hollow body, expanding plugs in the ends of the body, an oppositely threaded stem in the body and engaged in the plugs, said stem having a key receiving socket in each end, a piston rod having a tubular head embracing the pin and having an opening therethrough, the intermediate portion of the hollow body having an opening immediately inward of the opening of the rod, a worm wheel on the center of the stem and rotatable in the opening of the hollow body, a worm shaft in the opening of the rod and meshing with the worm wheel, and means carried by the rod and engaging with the worm shaft for holding the latter against accidental rotation.

In testimony whereof I affix my signature, in the presence of two witnesses.

THOMAS B. TEEL.

Witnesses:
  W. C. PETERSON,
  T. H. NULL.